H. A. INMAN.
BOX MAKING MACHINE.
APPLICATION FILED JUNE 13, 1913.

1,142,575.

Patented June 8, 1915.
6 SHEETS—SHEET 3.

Witnesses
T. L. Mockabee
B. M. Kent

Inventor
Harry A. Inman
by
Foster Freeman Watson & Coit
Attorneys

H. A. INMAN.
BOX MAKING MACHINE.
APPLICATION FILED JUNE 13, 1913.

1,142,575.

Patented June 8, 1915.
6 SHEETS—SHEET 4.

H. A. INMAN.
BOX MAKING MACHINE.
APPLICATION FILED JUNE 13, 1913.
1,142,575.
Patented June 8, 1915.
6 SHEETS—SHEET 5.
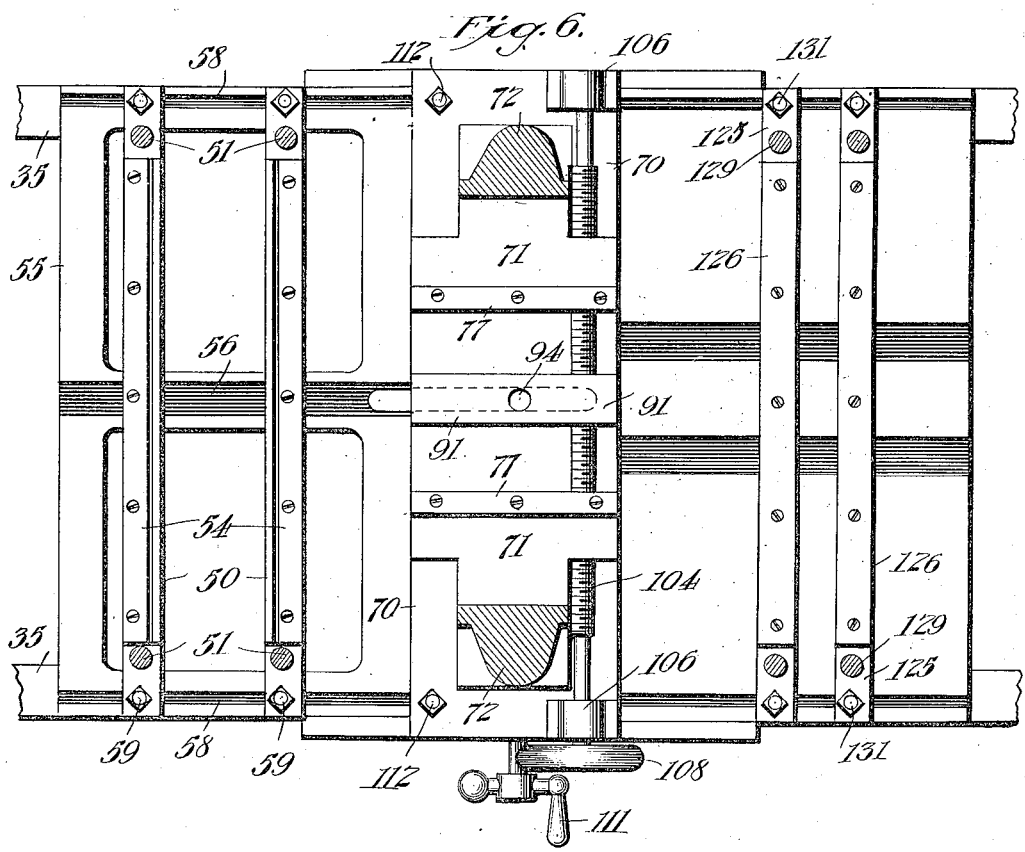
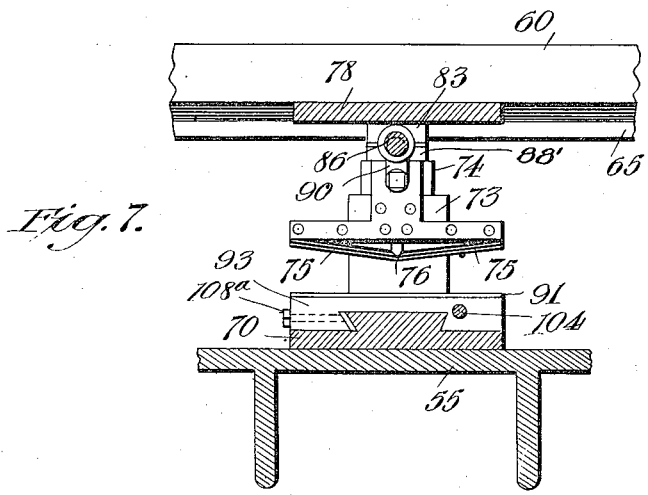

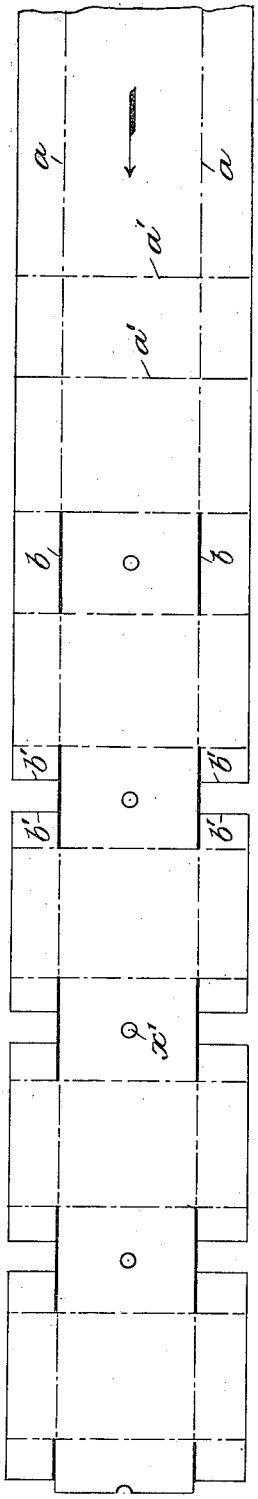
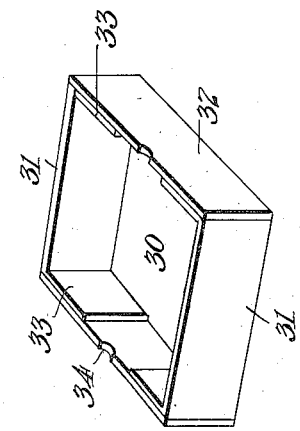
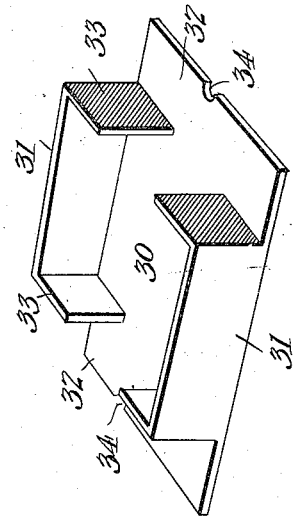

UNITED STATES PATENT OFFICE.

HARRY A. INMAN, OF AMSTERDAM, NEW YORK, ASSIGNOR TO INMAN MANUFACTURING COMPANY, INCORPORATED, OF AMSTERDAM, NEW YORK, A CORPORATION OF NEW YORK.

BOX-MAKING MACHINE.

1,142,575.  Specification of Letters Patent.  Patented June 8, 1915.

Original application filed June 24, 1910, Serial No. 568,740. Divided and this application filed June 13, 1913. Serial No. 773,477.

*To all whom it may concern:*

Be it known that I, HARRY A. INMAN, a citizen of the United States, and resident of Amsterdam, in the county of Montgomery and State of New York, have invented certain new and useful Improvements in Box-Making Machines, of which the following is a specification.

This invention relates to machines for making boxes of paper or like material.

One of the objects of this invention is to construct a machine which will take the material from the roll and form it into a completed box.

Another object is to construct the machine so that it may be adjusted to boxes of different sizes.

Another object is to construct a machine that will be simple in construction and operation, and so arranged that all parts will be accessible for adjustment and repairs.

Another object is to construct and arrange the elements or component parts so that they can be easily adjusted.

Another object is to improve and simplify the machine as to details.

Further objects will appear from the detailed description.

The present invention relates more specifically to the cutting and dieing mechanism and this application is a division of my prior Patent No. 1,067,253, granted July 15, 1913.

The invention will be described in connection with the accompanying drawings, in which—

Figure 1:
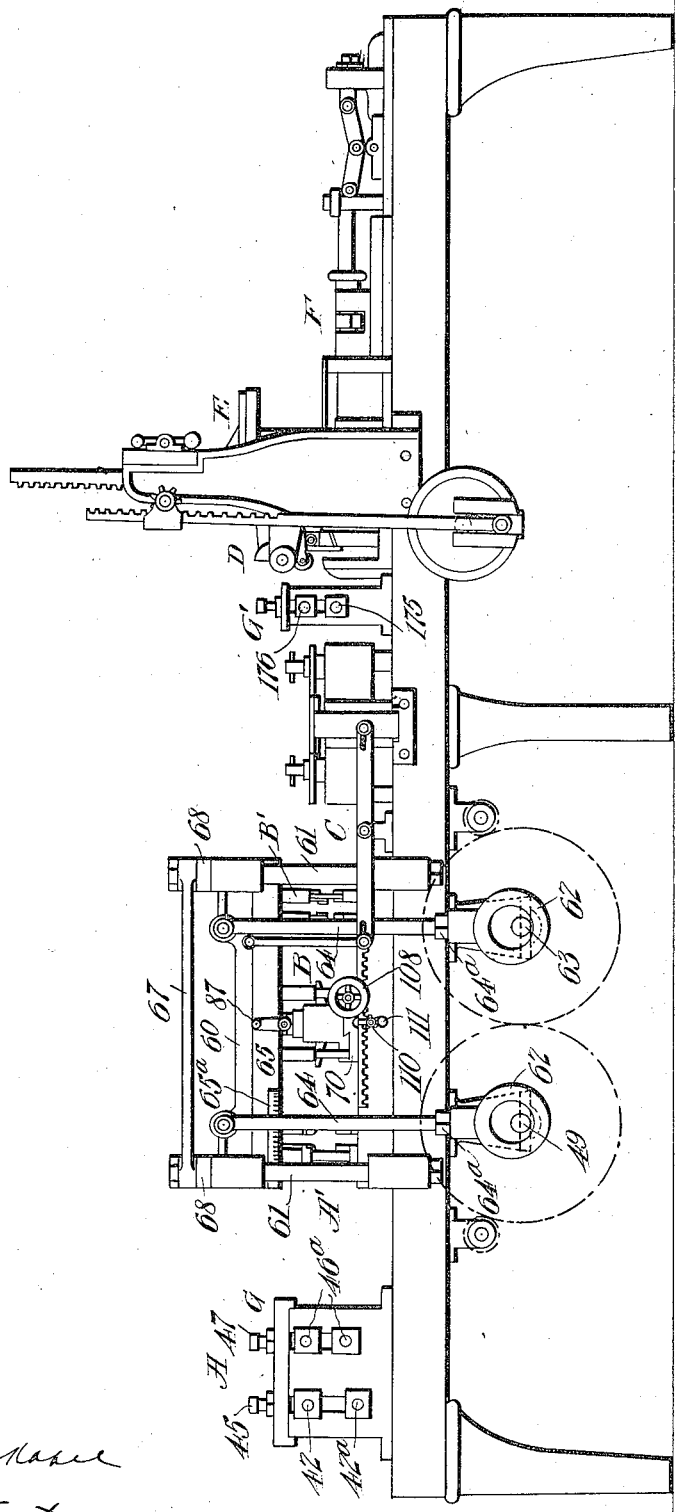
Figure 2:
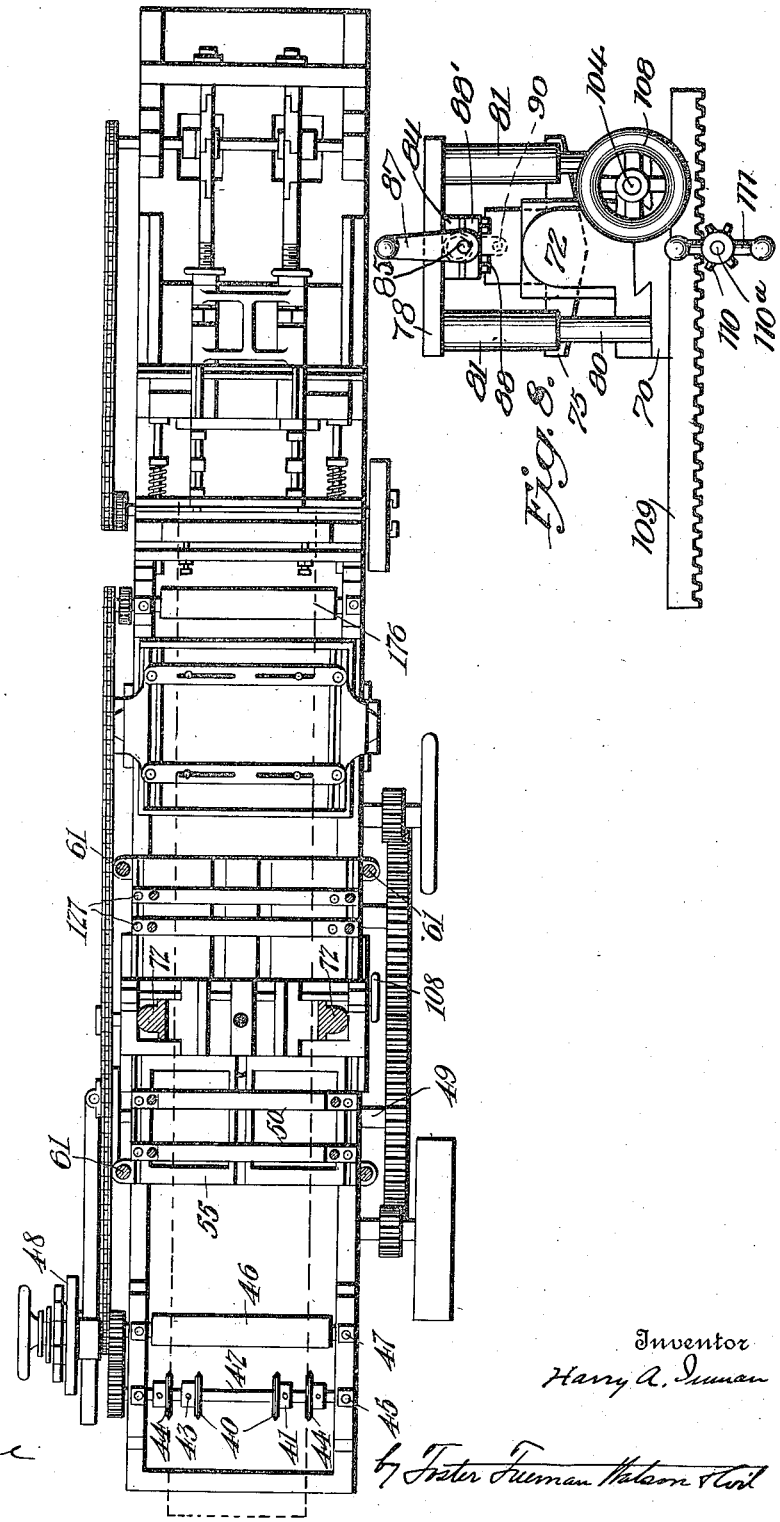
Figure 3:
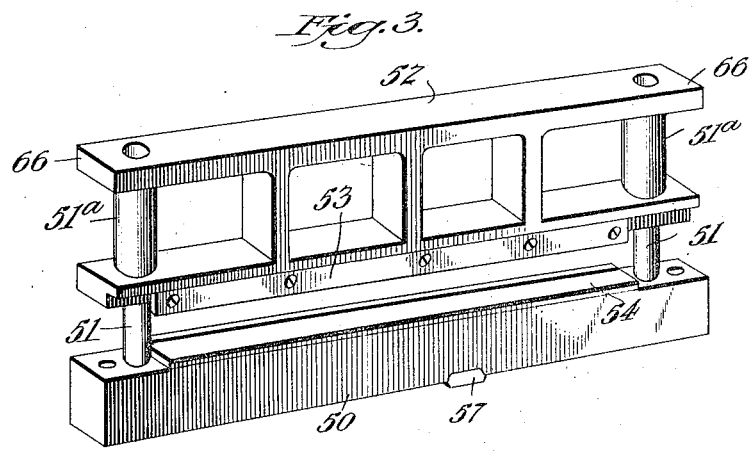
Figure 9:
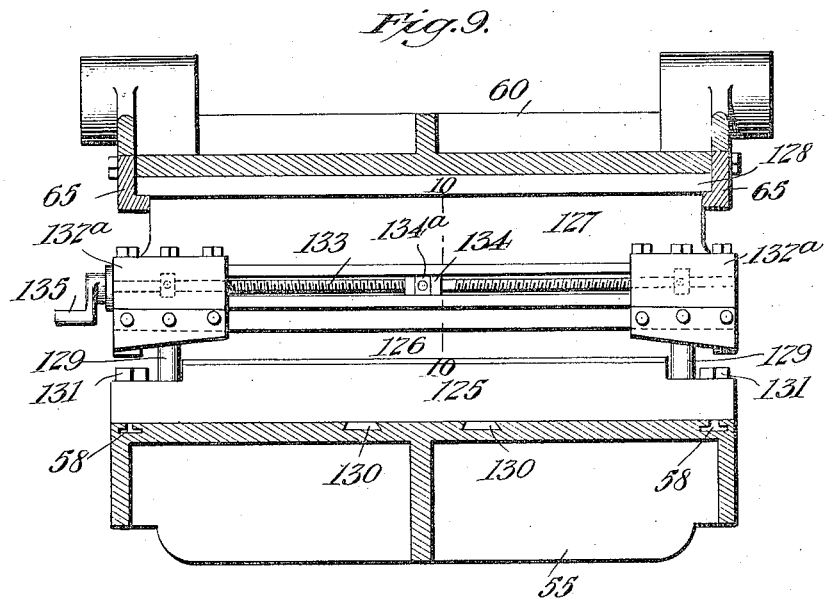
Figure 10:
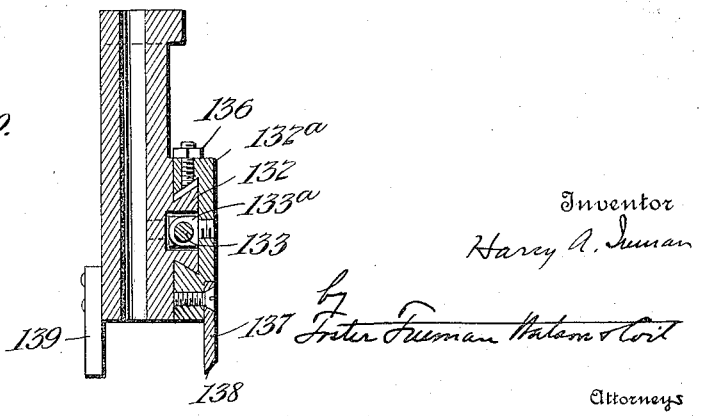
Figure 4:
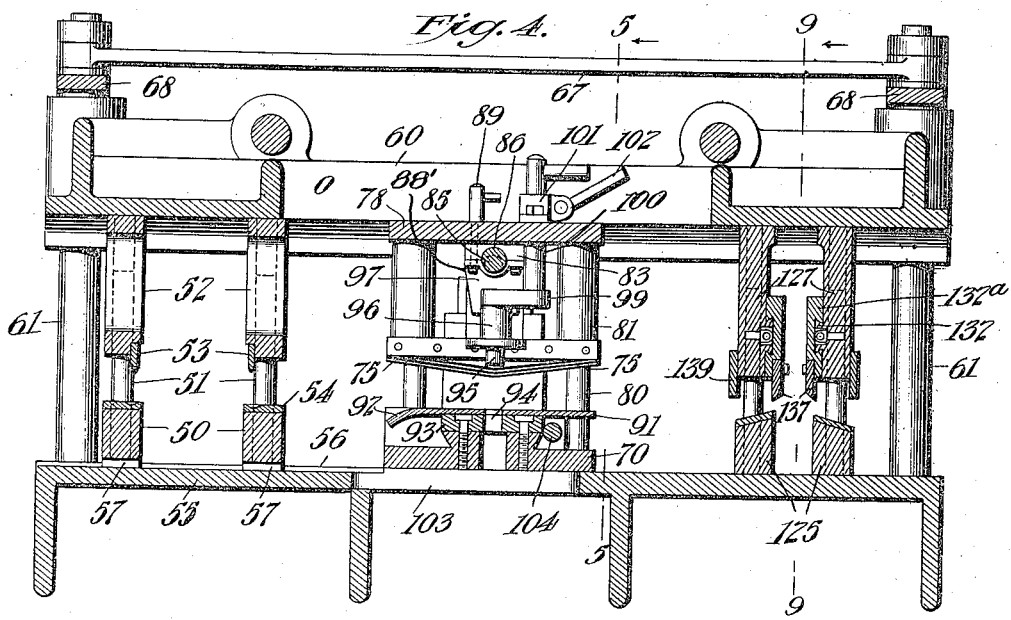
Figure 5:
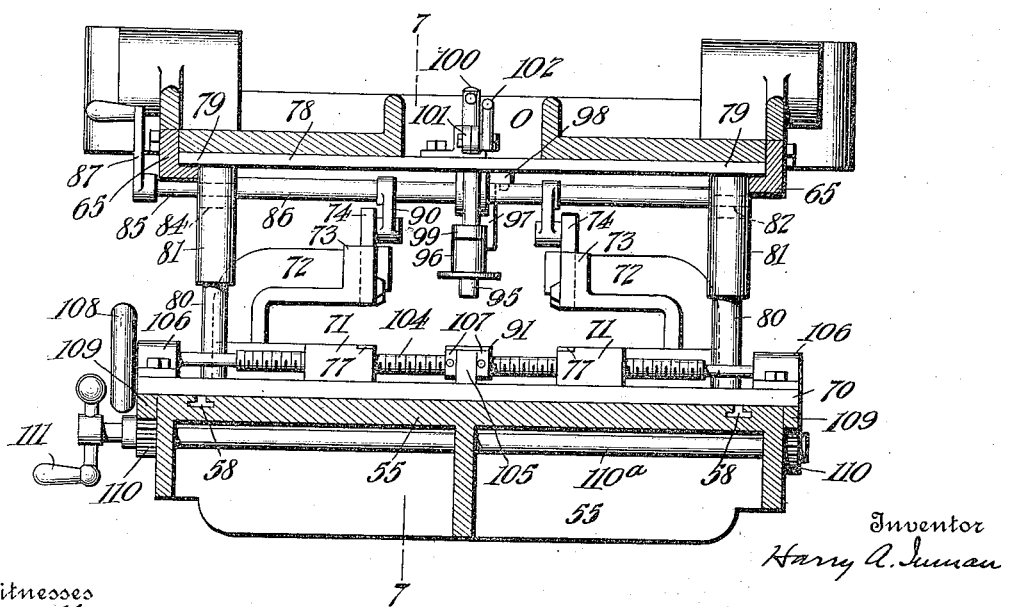

Figure 1 is a side elevation of the machine; Fig. 2 is a plan view in which some of the parts which are located above the paper line have been omitted; Fig. 3 is a perspective view of the cross scoring mechanism; Fig. 4 is a sectional view of a part of the mechanisms on an enlarged scale; Fig. 5 is a section on the line 5—5 Fig. 4; Fig. 6 is a section on the paper line of the mechanism shown in Fig. 4; Fig. 7 is a section on the line 7—7 Fig. 5; Fig. 8 is a side elevation of the mechanism shown in Fig. 5; Fig. 9 is a section on the line 9—9 Fig. 4; Fig. 10 is a section on the line 10—10 Fig. 9; Fig. 11 is a plan view of the web of material showing its condition as it is operated upon by the different mechanisms; Fig. 12 is a perspective view of the box partly assembled; and Fig. 13 is a perspective view of the assembled box.

Referring to Figs. 12 and 13 the box comprises a body member 30 having side flaps 31, end flaps 32 and corner flaps 33. The end flaps are provided with the usual finger holds or recesses 34.

The machine, generally speaking, comprises scoring mechanism A, cross scoring mechanism A', dieing mechanism B, B', pasting mechanism C, cutoff mechanism D, forming mechanism E and presser mechanism F. The web of material is drawn from a roll through suitable tension devices by means of feeding rolls G. An auxiliary pair of feeding rolls G' are also provided to feed the material through the machine. The roll support and the feeding rolls G are of substantially the same construction as shown in patent to Inman #657,418, September 4, 1900.

*The scoring mechanism.*—The longitudinal scoring mechanism is of substantially the form shown in the patent referred to. It comprises a pair of circular scoring knives or disks 40 provided with hubs or collars 41 and adjustably mounted upon a shaft 42, the scoring knives being secured in adjusted position by means of set screws 43. The shaft 42 has also mounted thereon trimmer knives 44 which may be secured in adjusted position by means of similar set screws. The shaft $42^a$ is provided with adjustable collars having recesses therein, which coöperate with the knives 40. The shaft $42^a$ is also provided with knives coöperating with the knives 44. The feeding mechanism G comprises upper and lower feeding rolls 46 mounted upon shafts $46^a$. The shafts 42 and $46^a$ may be adjusted by means of set screws 45 and 47 respectively. The shafts 42 and $46^a$ have mounted thereon spur gears, and a step by step movement is imparted from the shaft 49 by means of the mechanism designated 48. This mechanism comprises suitable pawl and ratchet mechanism, and is fully shown and described in the patent to Horace Inman, No. 1030183, dated June 18, 1912. It is not necessary that this mechanism be of the specific type shown in the patent referred to, since any mechanism whereby a step by step movement may be imparted to the shafts 42 and 46ª from the shaft 49 will accomplish the purpose.

The cross scoring mechanism comprises a pair of bases 50 located crosswise of the machine. Since the elements of this mechanism are identical, only one will be described in detail. The base 50 has mounted thereon a pair of posts 51 which enter guideways 51ª in the tool carrier 52. The tool carrier has mounted thereon a scoring knife 53 which engages a coöperating scoring die 54 on the base. A bed 55 is mounted upon and between the side members 35 of the frame, and is provided with a slideway 56 extending longitudinally of the machine. The base 50 is provided with a gib 57 which engages the slideway 56. The bed has also formed therein T-shaped slots or guideways 58, and the bases 50 are provided with coöperating T-shaped gibs into which are screwed clamping bolts 59. An operating head 60 is provided with guideways so as to slide upon vertical posts 61 secured to the bed. A pair of eccentrics 62 are mounted upon the shafts 49 and 63 and engage eccentric straps secured to connecting rods 64 pivotally connected to the operating head 60. The eccentrics are duplicated on the opposite side of the machine. The tool carrier is provided with extensions 66, and the operating head has bolted thereto side straps 65. These side straps form a guideway in which the carriers 52 are arranged to slide longitudinally of the machine. The posts 61 are braced at their upper end by means of cross bars 67 and 68.

The operation of the cross scoring mechanism will be obvious. After the material is moved to position the operating head 60 is reciprocated by means of the eccentrics so as to cause the tool carrier 52 to move downwardly and the knife 53 to coöperate with the die 54. The distance between the cross scores b' b' may be adjusted by moving the elements of the cross scoring mechanism longitudinally of the machine. After these elements are in position they may be clamped by means of the bolts 59.

In the specific construction shown the elements of the cross scoring mechanism are moved to adjusted position longitudinally of the machine by hand. It is obvious, however, that these elements may be adjusted as shown in the Inman Patent, No. 657,418. The vertical position of the cross scoring knives may be adjusted by adjusting the length of the connecting rods 64. To accomplish this the lower ends of the rods are screwed into the eccentric straps and secured in adjusted position by means of the lock nuts 64ª.

*The dieing mechanism.*—The dieing mechanism comprises slitting mechanism B and cross punching mechanism, or the mechanism for punching pieces from the flaps and designated B'.

*The slitting mechanism.*—A base 70 is mounted so as to slide longitudinally on the bed 55. The base has formed thereon a slideway on which move a pair of slides 71. Since the slides are of identical construction, only one will be described in detail. An overhanging arm 72 is formed upon or secured to the slide 71, and is provided with a guide or slideway 73 of dovetailed construction in which moves a slide 74. This slide has screwed or bolted thereto a knife comprising members 75. The knife members are of such a construction that the edge tapers down to a point 76, which point is located on the center line of the slideway on the base 70. It will thus be seen that the knife edges incline upwardly from the point 76. The base of the slide 71 is provided with a die 77 which coöperates with the knife 75.

A carrier 78 is provided with extensions 79 which engage the straps 65. The base 70 has mounted thereon posts 80 which coöperate with guideways formed in downwardly projecting lugs 81 secured to the carrier 78. The carrier 78 has secured thereto three bearings 82, 83 and 84 for a shaft or bar 85. This shaft is provided with an eccentric portion 86 and an operating handle 87. The bearings are provided with caps 88', and bolts 88 connect these caps to the bodies of the bearings. (See Fig. 8). In order to clamp the shaft or bar 85 in adjusted position, the center bearing 83 is arranged to be clamped on the shaft by a bolt which extends through the cap and bearing body and the carrier 78 and is provided with a head or handle 89. The lower end of this bolt screws into the cap or into a nut. The operating head is cut away as shown at O so that the head 89 will be accessible. Links 90 connect the knife slides 74 with the shaft or bar 86, the connection between the links and the shaft or bar 86 being such as to permit the links to slide longitudinally with respect to the shaft or bar.

A die plate 91 is secured to the base 70 and located along the longitudinal center line of the machine. The die plate is curved downwardly at 92 so as to allow the paper to be fed thereover more readily. The die plate is secured to the base 70 by means of screws which pass through a base member 93. The die plate has formed therein a hole 94, which coöperates with a punch 95. This punch is braced and adjustably mounted in a guideway 96 secured to a bracket 97, which is bolted to the carrier 78 at 98. The punch 94 is secured to a cross member 99, which is mounted upon a bar 100 arranged for adjustment in a bearing 101 which is bolted to the upper face of the carrier 78. The bearing is a split bearing and may be clamped to secure bar 100 and punch 95 in position by means of a clamp 102. By means of the above construction the position of the punch may be adjusted vertically, and the support for this punch clears the shaft 85. This punch is arranged to punch holes $x'$ in the web so as to form the finger holds 34. The bed 55 is provided with a slot 103 so as to permit the punched out material to drop through.

A right and left screw 104 is mounted in bearings 105 and 106 and is restrained against endwise movement by collars 107. This screw has a threaded engagement with the slides 71 and has mounted upon one end a hand wheel 108. By rotating this hand wheel the slides may be adjusted toward and from each other crosswise of the machine. It will be noted that these slides will be adjusted uniformly toward and from the longitudinal center line of the machine. In order to provide additional means for securing the slides in adjusted position a set screw $108^a$ may be provided. (See Fig. 7).

The base 70 is provided with gibs which engage the T slots 58 so that this base may be adjusted longitudinally of the machine. A pair of racks 109 are secured to this base and coöperate with spur gears 110 rigidly secured to the shaft $110^a$. This shaft has mounted upon it a handle 111 so that the base may be adjusted longitudinally of the machine by turning this handle. In order to secure the base in adjusted position on the bed 55 clamping bolts 112 are provided.

The slitting knives are arranged to cut longitudinal slits $b$ in the web. By adjusting the slides 71 toward and from each other crosswise of the machine the distance between these slits $b$ may be varied so as to adjust the machine for boxes of different widths. By adjusting the shaft or bar 86 through the medium of the handle 87 the vertical position of the knife may be varied. Now by varying the vertical position of the knife the length of the slit $b$ will be varied, since the knife edges incline upwardly. It will also be noted that since the inclination of the knives from the point 76 is the same the length of the slitted portion upon the opposite sides of the hole $x'$ is the same. It will thus be seen that by operating the handle 87 the lengths of the slits $b$ will be varied so as to adjust the slitting mechanism to boxes of different lengths. The base 70 as a whole may be adjusted longitudinally of the machine so as to adjust the slitting mechanism as a unit relatively to the other mechanisms.

*Cross punching mechanism or mechanism for punching pieces from the flaps.*—Where the height of the box is over one half its width, which latter dimension in this case is the dimension crosswise of the machine, it is necessary to punch out pieces from the corner flaps in order to prevent their overlapping. The mechanism for accomplishing this comprises a pair of bases 125 provided with dies 126. Since this mechanism comprises duplicate structures only one will be described in detail.

A tool carrier 127 is provided with extensions 128 which coöperate with the straps 65. This tool carrier is provided with guideways which coöperate with vertical posts 129 mounted upon base 125. The bed 55 is provided with guideways 130 which coöperate with gibs on the base. Clamping bolts 131 screw into and engage gibs which slide in the T-shaped slots 58. The carrier 127 is provided with a dovetailed slideway 132 which engages and carries a pair of slides $132^a$. A right and left screw 133 engages lugs $133^a$ in these slides and this screw is restrained against endwise movement by means of a pair of collars 134 engaging bearing lug $134^a$ located at the center of the slideway. The screw 133 has mounted thereon a handle 135 so that by operating the handle the slides $132^a$ may be moved uniformly toward and from the center of the machine. The slides are clamped in adjusted position by means of set screws 136. A pair of knives 137 are mounted upon the slides and coöperate with the dies 126 on the bases. The cutting edges 138 of the knives are inclined so that they will operate with a draw cut. Additional guide and brace members 139 may be provided in order to brace the knife in its movements. The knives and dies are arranged to cut the corner flaps on the lines $b'$ Fig. 11. By adjusting the bases 50 and the coöperating parts toward and from each other the distance apart of the lines $b'$ may be varied. In other words by adjusting the elements toward and from each other the mechanism is expanded so as to vary the length of the cut out pieces, the length being in this case taken as the dimension longitudinally of the machine. By adjusting the carriers $132^a$ toward and from each other the position of the knives with respect to the die is varied, and in this way the length of the cut crosswise of the machine is varied. In this way the width of the punched out piece is varied, the width being taken as the dimension crosswise of the machine.

It will be noted that the knives and dies of one element are located reversely with respect to those of the other element. In this way the elements may be moved close together so that the length of the cut out portions may be made very small. In this specific construction the elements of the mechanism are adjusted longitudinally of the machine by hand. It is obvious, however, that these mechanisms may be adjusted in the same manner as the elements of the cross scoring mechanism in the Patent No. 657,418 above referred to. Not only may the elements of the mechanism be adjusted relatively to each other, but the mechanisms so far described may be adjusted relatively to each other as units. This is necessary in order to adjust the machine for boxes of different sizes.

Where, of course, the height of the box is less than one half its width then the cross punching mechanism can be dispensed with, and in such a case it can either be entirely removed from the machine, or the knife slides 132 can be moved outwardly until the knives will not engage the paper. The above invention, therefore provides a simple means for throwing the cross punching mechanism into and out of operation as required.

*Operation of the machine.*—The web of material is fed through the machine by means of the feeding mechanisms G and G'. The material is scored longitudinally on the lines $a$ by means of the longitudinal scoring mechanism A, and is simultaneously trimmed by means of the trimming knives 44. As the web is moved to position underneath the operating head 60 and comes to rest the head descends and the cross scores $a'$ are formed on the web by means of the cross scoring mechanism A'. The material is now fed to position underneath the slitting mechanism B which forms the slits $b$ upon the next downward movement of the operating head. The web is now fed underneath the cross punching mechanism B' which punches out pieces from the flaps along the lines $b'$ during the succeeding downward movement of the operating head. The web is now fed to the pasting mechanism C where the flaps are pasted and then to the forming mechanism E. The elements of the different mechanisms are adjustable to boxes of different sizes. The different mechanisms may be adjusted to boxes of different widths, lengths and heights. In no case is it necessary to substitute different dies, but the elements of the mechanisms themselves are adjustable.

In order to adjust the machine for boxes of a certain size the procedure is as follows: The web of material is fed between the rollers 46 of the feeding mechanism G. The longitudinal scoring knives 40 are then adjusted so that the scoring lines $a$ will be a distance apart equal to the width of the box. The trimmers 44 are then adjusted so that they will be spaced from the scoring knives a distance equal to the height of the box. The web is now fed forward between the rollers 175 and 176 of the feeding mechanism G'. The feeding mechanisms G and G' are then operated so as to stretch the material taut between G and G'. The cross scoring mechanism A' is now adjusted so that the scoring lines $a'$ will be spaced apart a distance equal to twice the height of the box. The step by step feeding mechanism 48 is now adjusted so that the feed will be equal to the length of the box in the flat. The cross scores are also adjusted by scale $65^a$ so that they will be in the proper position. The material is now fed forward one step or the length of the box and the slitting mechanism B is adjusted longitudinally of the machine by the handle 111 so that the points 76 of the slitting knives and the punch 95 will be located on a line midway between the lines $a'$, the position of the punch being designated by the reference character $x$ in Fig. 12. The slitting knives are now adjusted crosswise of the machine by means of the hand wheel 108 until they aline with the longitudinal scoring lines $a$. The slitting knives are now adjusted vertically by means of the handle 87 until the length of the slit is equal to twice the height of the box, or in other words, until the ends of the slits $b$ reach the cross scoring lines $a'$. The material is now fed forward another step and the cross punching mechanism B' is adjusted so as to punch out pieces from the flaps on the lines $b'$, the length of the cuts crosswise of the machine being adjusted by means of the handle 135. The material is now fed forward through the pasting and forming mechanisms and these are adjusted in the manner described in my Patent No. 1,067,253.

In the specification and claims the terms "width," "length," and "height" are used. These terms are relative terms, and are used for convenience to designate the different dimensions of the box. In the specific construction shown the width may be taken as the dimension crosswise of the machine, and the length as longitudinally of the machine.

It is obvious that some of the features of this machine may be applied to machines which complete the blank, while other features may be applied to machines which form the blank into a box. Furthermore, certain adjustments may be used independently of others, and certain specific mechanisms may be used independently of other specific mechanisms. It is further obvious that various changes may be made in the details of construction without departing from this invention, and it is, therefore, to be understood that this invention is not limited to the specific construction shown and described.

Having thus described the invention, what is claimed is:

1. In a box machine, the combination with means for feeding the material, of slitting mechanism including a base, a pair of slides mounted on said base, each slide having a die and an overhanging arm, a guide in each arm, a knife in each guide for coöperating with one of said dies, an actuator for operating said knives, means for adjusting said slides toward and from each other, a slidable connection between said knives and actuator, and means for adjusting said connection so as to adjust the length of the slits.

2. In a box machine, the combination with means for feeding the material, of slitting mechanism including a base, a pair of slides mounted on said base, each slide having a die and an overhanging arm, a guide in each arm, a knife in each guide for coöperating with one of said dies, an actuator including a bar for operating said knives, means for adjusting said slides toward and from each other, means for adjusting said bar so as to adjust the length of the slits, and a slidable connection between said knives and bar.

3. In a box machine, the combination with means for feeding the material, of slitting mechanism including a base, a pair of slides mounted on said base, each slide having a die and a knife guide, a knife in each guide each coöperating with one of said dies, an actuator for said knives, and a right and left hand screw for adjusting said slides toward and from each other.

4. In a box machine, the combination with means for feeding the material, of slitting mechanism including a base, a pair of dies and knife guides mounted on said base, a knife in each guide each coöperating with one of said dies, an actuator for said knives, and means for adjusting said actuator so as to adjust the length of the slits.

5. In a box machine, the combination with means for feeding the material, of slitting mechanism including a base, a pair of dies and knife guides mounted on said base, a knife in each guide for coöperating with one of said dies, an actuator for said knives, said actuator including an eccentric bar, and means for rotating said bar so as to adjust the length of the slits.

6. In a box machine, the combination with means for feeding the material, of slitting mechanism including a base, a pair of slides mounted on said base, each slide having a die and a knife guide, a knife in each guide for coöperating with one of said dies, an actuator for said knives, said actuator including an eccentric bar, means for rotating said bar so as to adjust the length of the slits, means for adjusting said slides toward and from each other, and a slidable connection between said knives and bar.

7. In a box machine, the combination with means for feeding the material, of slitting mechanism including a base, a bed, a slideway on said bed for said base, a pair of slides mounted on said base, each slide having a die and a knive guide, knives in said guides and coöperating with said dies, means for adjusting said slides toward and from each other on said base, means for adjusting said base on said bed, and an actuator for said knives.

8. In a box machine, the combination with means for feeding the material, of slitting mechanism including a base, a bed, a slideway on said bed for said base, a pair of slides mounted on said base, each slide having a die and a knife guide, knives in said guides and coöperating with said dies, means for adjusting said slides toward and from each other on said base, means for adjusting said base on said bed, an actuator for said knives, and means for adjusting said actuator so as to adjust the length of the slits.

9. In a box machine, the combination with means for feeding the material, of slitting mechanism including a base, a bed, a slideway on said bed for said base, a pair of slides mounted on said base, each slide having a die and a knife guide, knives in said guides and coöperating with said dies, means for adjusting said slides toward and from each other on said base, additional mechanism for coöperating on said material and mounted on said bed, means for adjusting said base relatively to said additional mechanism, and an actuator for said knives.

10. In a box machine, the combination with means for feeding the material, of slitting mechanism including a base, a bed, a slideway on said bed for said base, a pair of slides mounted on said base, each slide having a die and a knife guide, knives in said guides and coöperating with said dies, means for adjusting said slides toward and from each other on said base, additional mechanism for operating on said material and mounted on said bed, means for adjusting said base relatively to said additional mechanism, an actuator for said knives, and means for adjusting said actuator so as to adjust the length of the slits.

11. In a box machine, the combination with means for feeding the material, of slitting mechanism including a base, a pair of slides mounted on said base, each slide having a die and a knife guide, knives in said guides coöperating with said dies, a coöperating punch and die located between said slides and mounted on said base, and a common actuator for said knives and punch.

12. In a box machine, the combination with means for feeding the material, of slitting mechanism including a base, a pair of slides mounted on said base, each slide having a die and a knife guide, knives in said guides coöperating with said dies, a coöperating punch and die located between said slides and mounted in a fixed position on said base, means for adjusting said slides toward and from said punch, and a common actuator for said knives and punch.

13. In a box machine, the combination with means for feeding the material, of slitting mechanism including a base, a bed, a slideway on said bed for said base, a pair of slides mounted on said base, each slide having a die and a knife guide, knives in said guides and coöperating with said dies, a coöperating punch and die located between said slides and mounted on said base, an actuator for said knives and punch, and means for adjusting said base on said bed.

14. In a box machine, the combination with means for feeding the material, of slitting mechanism including a base, a bed, a slideway on said bed for said base, a pair of slides mounted on said base, each slide having a die and a knife guide, knives in said guides and coöperating with said dies, a coöperating punch and die located between said slides and mounted on said base, a carrier for said knives and punch, an operating head, a slideway on said head for said carrier, and means for adjusting said base on said bed.

15. In a box machine, the combination with means for feeding the material, of slitting mechanism including a base, a bed, a slideway on said bed for said base, a pair of slides mounted on said base, each slide having a die and a knife guide, knives in said guides and coöperating with said dies, a coöperating punch and die located between said slides and mounted on said base, a carrier for said knives and punch, an operating head, straps connecting said carrier to said head, and means for adjusting said base on said bed.

16. In a box machine, the combination with means for feeding the material, of slitting mechanism including a base, a bed, a slideway on said bed for said base, a pair of slides mounted on said base, each slide having a die and a knife guide, knives in said guides and coöperating with said dies, a coöperating punch and die located between said slides and mounted on said base, a carrier for said knives and punch, a bar connecting said carrier and knives, means for adjusting said bar so as to adjust the length of the slits, a slideway on said head for said carrier, and means for adjusting said base on said bed.

17. In a box machine, the combination with means for feeding the material, and mechanism for punching out pieces from the flaps including a pair of coöperating knife and die members, means for actuating said knife members, means for adjusting said knife members so as to vary the length of the punched out pieces, and means for adjusting said knife members toward and from each other to vary the width of the punched out pieces.

18. In a box machine, the combination with means for feeding the material, and mechanism for punching out pieces from the flaps including cutting means, means for actuating said cutting means, and means for expanding and contracting said cutting means so as to vary the size of the punched out pieces.

19. In a box machine, the combination with means for feeding the material, and mechanism for punching out pieces from the flaps including cutting means, means for actuating said cutting means, means for expanding and contracting said cutting means so as to vary the length of the punched out pieces, and means for adjusting said cutting means so as to vary the width of the punched out pieces.

20. In a box machine, the combination with means for feeding the material longitudinally of the machine, of mechanism for punching out pieces from the flaps including cutting means, means for actuating said cutting means, and means for expanding and contracting said cutting means longitudinally of said machine so as to vary the length of the punched out pieces.

21. In a box machine, the combination with means for feeding the material longitudinally of the machine, of mechanism for punching out pieces from the flaps including cutting means, means for actuating said cutting means, means for expanding and contracting said cutting means longitudinally of said machine so as to vary the length of the punched out pieces, and means for adjusting said cutting means transversely of said machine so as to vary the width of the punched out pieces.

22. In a box machine, the combination with means for feeding the material longitudinally of the machine, of mechanism for punching out pieces from the flaps including cutting means, means for actuating said cutting means, means for expanding and contracting said cutting means longitudinally of said machine so as to vary the length of the punched out pieces, and means whereby said cutting means may be adjusted longitudinally of the machine.

23. In a box machine, the combination with means for feeding the material longitudinally of the machine, of mechanism for punching out pieces from the flaps including cutting means, means for actuating said cutting means, means for expanding and contracting said cutting means longitudinally of said machine so as to vary the length of the punched out pieces, means for adjusting said cutting means transversely of said machine so as to vary the width of the punched out pieces, and means whereby said cutting means may be adjusted longitudinally of the machine.

24. In a box machine, the combination with means for feeding the material longitudinally of the machine, of mechanism for punching out pieces from the flaps including cutting mechanisms located crosswise of said machine, means for actuating said cutting mechanisms, and means for expanding and contracting said cutting mechanisms longitudinally of the machine so as to vary the length of the punched out pieces.

25. In a box machine, the combination with means for feeding the material longitudinally of the machine, of mechanism for punching out pieces from the flaps including cutting mechanisms located crosswise of said machine, means for actuating said cutting mechanisms, means for expanding and contracting said cutting mechanisms longitudinally of the machine so as to vary the length of the punched out pieces, and means for adjusting said mechanisms crosswise of the machine toward and from each other so as to vary the width of the punched out pieces.

26. In a box machine, the combination with means for feeding the material longitudinally of the machine, of mechanism for punching out pieces from the flaps including cutting mechanisms located crosswise of said machine, means for actuating said cutting mechanisms, means for expanding and contracting said cutting mechanisms longitudinally of the machine so as to vary the length of the punched out pieces, means for adjusting said mechanisms crosswise of the machine toward and from each other so as to vary the width of the punched out pieces, and means whereby said mechanisms may be adjusted longitudinally of the machine.

27. In a box machine, the combination with means for feeding the material longitudinally of the machine, of mechanism for punching out pieces from the flaps including a pair of slides extending crosswise of the machine, coöperating knives and dies on said slides, means for actuating said knives, and means whereby said slides may be adjusted toward and from each other longitudinally of the machine so as to vary the length of the cut out pieces.

28. In a box machine, the combination with means for feeding the material longitudinally of the machine, of mechanism for punching out pieces from the flaps including a pair of slides extending crosswise of the machine, coöperating knives and dies on said slides, the knives and dies on one slide being positioned reversely from those on the other slide, means for actuating said knives, and means whereby said slides may be adjusted toward and from each other longitudinally of the machine so as to vary the length of the cut out pieces.

29. In a box machine, the combination with means for feeding the material longitudinally of the machine, of mechanism for punching out pieces from the flaps including a support extending crosswise of the machine, a pair of slides on said support, knives on said slides, a coöperating die on said support, means for adjusting said slides crosswise of the machine so as to vary the position of the cutting edges with respect to the die, whereby the widths of the punched out pieces are varied, and means for actuating said knives.

30. In a box machine, the combination with means for feeding the material longitudinally of the machine, of mechanism for punching out pieces from the flaps including a support extending crosswise of the machine, a pair of slides on said support, knives on said slides, a coöperating die on said support, and means for adjusting said slides crosswise of and toward and from the center of the machine so as to vary the position of the inside extremities of the cutting edges with respect to the die, whereby the widths of the punched out pieces are varied, and means for actuating said knives.

31. In a box machine, the combination with means for feeding the material longitudinally of the machine, of mechanism for punching out pieces from the flaps including a pair of supports extending crosswise of the machine, a pair of slides on each support, knives on said slides, a coöperating die on each support, means for adjusting said slides crosswise of said support so as to vary the width of the punched out pieces, means for adjusting said supports toward and from each other longitudinally of the machine so as to vary the length of the punched out pieces, and means for actuating said knives.

32. In a box machine, the combination with means for feeding the material longitudinally of the machine, of mechanism for punching out pieces from the flaps including a pair of supports extending crosswise of the machine, a pair of slides on each support, knives on said slides, a coöperating die on each support, means for adjusting said slides crosswise of said support so as to vary the position of the cutting edges with respect to the die, whereby the lengths of the punched out pieces are varied, means for adjusting said supports toward and from each other longitudinally of the machine so as to vary the length of the punched out pieces, and means for actuating said knives.

33. In a box machine, the combination with means for feeding the material longitudinally of the machine, of mechanism for punching out pieces from the flaps including a base extending crosswise of the machine, a bed, a slideway on said bed for said base, a die on said base, a pair of knives coöperating with said die, a knife carrier, an operating head, and a slideway on said head for said carrier, whereby said base and carrier may be adjusted longitudinally of said machine.

34. In a box machine, the combination with means for feeding the material longitudinally of the machine, of mechanism for punching out pieces from the flaps including a base extending crosswise of the machine, a bed, a slideway on said bed for said base, a die on said base, a pair of knives coöperating with said die, a knife carrier, an operating head, a slideway on said head for said carrier, whereby said base and carrier may be adjusted longitudinally of said machine, and means for adjusting said knives toward and from each other on said carrier.

35. In a box machine, the combination with means for feeding the material longitudinally of the machine, of mechanism for punching out pieces from the flaps including a pair of bases extending crosswise of the machine, a bed, a slideway on said bed for said bases, dies on said bases, knives coöperating with said dies, carriers for said knives, an operating head, a slideway in said head for said carriers, whereby said bases and carriers may be adjusted longitudinally of said machine toward and from each other, and means for adjusting the knives on a carrier toward and from each other.

36. In a box machine, the combination with means for feeding the material longitudinally of the machine, of cross scoring mechanism, slitting mechanism, mechanism for punching out pieces from the box flaps, means for adjusting the elements of said cross scoring mechanism toward and from each other, means for adjusting said slitting mechanism so as to adjust the length of the slits, means for expanding said punching mechanism longitudinally of the machine so as to vary the length of the punched pieces, and means for operating said mechanisms.

37. In a box machine, the combination with means for feeding the material longitudinally of the machine, of longitudinal scoring mechanism, cross scoring mechanism, slitting mechanism including slitting knives, mechanism for punching out pieces from the box flaps including knives and dies located crosswise of the machine, means for adjusting the elements of said longitudinal scoring mechanism toward and from each other, means for adjusting said slitting knives toward and from each other, means for adjusting said knives and dies of said punching out mechanism toward and from each other, and means for operating said mechanisms.

38. In a box machine the combination with means for feeding the material longitudinally of the machine, of longitudinal scoring mechanism, cross scoring mechanism, slitting mechanism including slitting knives, mechanism for punching out pieces from the box flaps including knives and dies located crosswise of the machine, means for adjusting the elements of said longitudinal scoring mechanism toward and from each other, means for adjusting the elements of said cross scoring mechanism toward and from each other, means for adjusting said slitting knives so as to adjust the length of the slits, means for adjusting said slitting knives toward and from each other, means for expanding said punching out mechanism, means for adjusting said knives and dies of said punching mechanism toward and from each other, and means for operating said mechanisms.

39. In a box machine the combination with means for feeding the material longitudinally of the machine, of longitudinal scoring mechanism, cross scoring mechanism, slitting mechanism including slitting knives, mechanism for punching out pieces from the box flaps including knives and dies located crosswise of the machine, means for adjusting the elements of said longitudinal scoring mechanism toward and from each other, means for adjusting said slitting knives toward and from each other, means for adjusting said knives and dies of said punching out mechanism toward and from each other, means whereby said mechanisms may be adjusted toward and from each other longitudinally of the machine, and means for operating said mechanisms.

40. In a box machine the combination with means for feeding the material longitudinally of the machine, of longitudinal scoring mechanism, cross scoring mechanism, slitting mechanism including slitting knives, mechanism for punching out pieces from the box flaps including knives and dies located crosswise of the machine, means for adjusting the elements of said longitudinal scoring mechanism toward and from each other, means for adjusting the elements of said cross scoring mechanism toward and from each other, means for adjusting said slitting knives so as to adjust the length of the slits, means for adjusting said slitting knives toward and from each other, means for expanding said punching out mechanism, means for adjusting said knives and dies of said punching mechanism toward and from each other, means whereby said mechanism may be adjusted toward and from each other longitudinally of the machine, and means for operating said mechanisms.

41. In a box machine the combination with means for feeding the material longitudinally of the machine, of cross scoring mechanism, slitting mechanism, mechanism for punching out pieces from the box flaps, means for adjusting the elements of said cross scoring mechanism toward and from each other, means for adjusting said slitting mechanism so as to adjust the length of the slits, means for expanding said punching mechanism longitudinally of the machine so as to vary the length of the punched out pieces, means whereby said mechanisms may be adjusted toward and from each other longitudinally of the machine, and means for operating said mechanisms.

42. In a box machine, the combination with means for feeding the material longitudinally of the machine, of cross scoring mechanism, slitting mechanism, mechanism for punching out pieces from the box flaps, said mechanisms each having a base and tool carrier, a bed, slideways on said bed for the bases of said mechanisms, an operating head, a slideway on said head for said carriers, whereby said mechanisms may be adjusted individually or relatively longitudinally of the machine.

43. In a box machine, the combination with means for feeding the material longitudinally of the machine, of cross scoring mechanism, slitting mechanism, mechanism for punching out pieces from the box flaps, said mechanisms each having a base and tool carrier, a bed, slideways on said bed for the bases of said mechanisms, an operating head, straps connecting said carriers to said head, whereby said mechanisms may be adjusted individually or relatively longitudinally of the machine.

44. In a box machine, the combination with means for feeding the material longitudinally of the machine, of cross scoring mechanism comprising individual units each having coöperating dies and scoring knives, slitting mechanism comprising a unitary structure, mechanism for punching out pieces from the box flaps comprising individual units each having coöperating dies and knives, a bed supporting all of said units, means whereby said units may be adjusted longitudinally of said machine, and means for operating said mechanisms.

45. In a box machine, the combination with means for feeding the material longitudinally of the machine, of cross scoring mechanism comprising individual units each having coöperating dies and scoring knives, slitting mechanism comprising a unitary structure, mechanism for punching out pieces from the box flaps comprising individual units each having coöperating dies and knives, each of said mechanisms having tool carriers, a bed, a slideway in said bed for said mechanisms, an operating head, a slideway in said head for said carriers, whereby said units may be adjusted longitudinally of said machine.

46. In a box machine, the combination with means for feeding the material longitudinally of the machine, of dieing mechanism including mechanism for punching out pieces from the flaps, means for operating said dieing mechanism, and means for throwing said punching mechanism out of operation.

47. In a box machine, the combination with means for feeding the material longitudinally of the machine, of dieing mechanism including mechanism for punching out pieces from the flaps, means for operating said dieing mechanism, and means whereby said punching mechanism may be removed from the machine.

48. In a box machine, the combination with means for feeding the material longitudinally of the machine, of dieing mechanism including mechanism for punching out pieces from the flaps, means for operating said dieing mechanism, and means for adjusting said punching mechanism crosswise of the machine so as to throw said mechanism out of operation.

49. In a box machine, the combination with means for feeding the material longitudinally of the machine, of dieing mechanism including mechanism for punching out pieces from the flaps, means for operating said dieing mechanism, and means for adjusting said punching mechanism crosswise of the machine so as to vary the size of the punched out pieces and so as to throw said mechanism out of operation.

50. In a box machine, the combination with means for feeding the material longitudinally of the machine, of dieing mechanism including slitting mechanism and mechanism for punching out pieces from the flaps, means for operating said mechanisms, and means for throwing said punching mechanism out of operation.

51. In a box machine, the combination with means for feeding the material longitudinally of the machine, of dieing mechanism including slitting mechanism and mechanism for punching out pieces from the flaps, means for operating said mechanisms, means for adjusting said mechanisms toward and from each other, and means whereby said punching mechanism may be removed from the machine.

52. In a box machine, the combination with means for feeding the material longitudinally of the machine, of dieing mechanism including slitting mechanism and mechanism for punching out pieces from the flaps, means for operating said mechanisms, means for adjusting said mechanisms crosswise of the machine, and means for throwing said punching mechanism out of operation.

53. In a box machine, the combination with means for feeding the material longitudinally of the machine, of dieing mechanism including slitting mechanism and mechanism for punching out pieces from the flaps, means for operating said mechanisms, means for adjusting said mechanisms crosswise of the machine, and means permitting said punching mechanism to be moved crosswise of the machine beyond the material so as to be out of operation.

54. In a box machine, the combination with means for feeding the material longitudinally of the machine, of dieing mechanism including mechanism for punching out pieces from the flaps, means for operating said dieing mechanism, a bed for supporting said punching mechanism, a slideway in said
5 bed for said mechanism, and means whereby said punching mechanism may be removed from said slideway and said machine.

In testimony whereof I affix my signature in presence of two witnesses.

HARRY A. INMAN.

Witnesses:
 MARIE B. SNYDER,
 ELLEN V. SHEEHY.